(12) United States Patent
Junnonen et al.

(10) Patent No.: US 11,115,399 B2
(45) Date of Patent: Sep. 7, 2021

(54) METHOD AND APPARATUS FOR GENERATING AN INTELLIGENT PRIMARY KEY FACILITATING FASTER OBJECT RETRIEVAL

(71) Applicant: HERE GLOBAL B.V., Eindhoven (NL)

(72) Inventors: Tomas Junnonen, Cambridge, MA (US); Srividya Rajagopalan, Bedford, MA (US); Richin Jain, Arlington, MA (US)

(73) Assignee: HERE GLOBAL B.V., Eindhoven (NL)

( * ) Notice: Subject to any disclaimer, the term of this patent is extended or adjusted under 35 U.S.C. 154(b) by 254 days.

(21) Appl. No.: 15/804,126

(22) Filed: Nov. 6, 2017

(65) Prior Publication Data
US 2018/0063116 A1 Mar. 1, 2018

Related U.S. Application Data

(63) Continuation of application No. 14/806,202, filed on Jul. 22, 2015, now Pat. No. 9,843,568.

(51) Int. Cl.
*H04L 29/06* (2006.01)
*H04L 9/00* (2006.01)
(Continued)

(52) U.S. Cl.
CPC ............ *H04L 63/08* (2013.01); *G06F 16/137* (2019.01); *G06F 16/152* (2019.01); *G06F 21/00* (2013.01);
(Continued)

(58) Field of Classification Search
CPC .. G06F 16/137; G06F 16/152; G06F 16/2255; G06F 16/325; G06F 16/9014;
(Continued)

(56) References Cited

U.S. PATENT DOCUMENTS

2006/0020813 A1* 1/2006 Birk .................. H04L 63/083
713/182
2007/0186212 A1 8/2007 Mazzaferri et al.
(Continued)

OTHER PUBLICATIONS

Non-Final Office Action for U.S. Appl. No. 14/806,202 dated Nov. 1, 2016, 19 pages.
(Continued)

*Primary Examiner* — Daniel B Potratz
(74) *Attorney, Agent, or Firm* — Alston & Bird LLP (57) ABSTRACT

Various methods are provided for facilitating a reduction in the number of required search operations during account creation. One example method may comprise causing creation of a user account object configured for storage in a database, the user account object comprising user personal information, causing creation of a user linked account object configured for storage in the database, the user linked account object comprising user credential information, the user linked account object linked the user account object, generating, via processor, an identification field of the user linked account object, generation of the identification field comprising: receiving at least identification information and an account type; accessing a realm; and utilizing a hash function to generate a composite key as a function of the identification information, the account type, and the realm.

18 Claims, 4 Drawing Sheets

(51) Int. Cl.
*H04L 9/08* (2006.01)
*G06F 16/14* (2019.01)
*G06F 21/00* (2013.01)
*G06F 21/62* (2013.01)
*G06F 16/13* (2019.01)

(52) U.S. Cl.
CPC ............ *G06F 21/6227* (2013.01); *H04L 9/00* (2013.01); *H04L 9/0866* (2013.01)

(58) Field of Classification Search
CPC ..... G06F 21/00; G06F 21/6227; H04L 63/08; H04L 9/00; H04L 9/0866
See application file for complete search history.

(56) References Cited

U.S. PATENT DOCUMENTS

| | | |
|---|---|---|
| 2007/0192329 A1 | 8/2007 | Croft et al. |
| 2007/0198656 A1 | 8/2007 | Mazzaferri et al. |
| 2010/0050247 A1* | 2/2010 | Hashimoto ........... G06F 21/335 726/10 |
| 2013/0262123 A1* | 10/2013 | Boukadakis ............ G10L 15/00 704/270.1 |
| 2014/0281578 A1* | 9/2014 | Bennison ............ G06F 21/6227 713/189 |
| 2015/0161153 A1* | 6/2015 | Gheith .................. G06F 3/0608 707/695 |
| 2015/0281225 A1* | 10/2015 | Schoen ................... H04L 63/06 726/9 |
| 2016/0171039 A1* | 6/2016 | Eisenreich .......... G06F 16/2365 707/698 |

OTHER PUBLICATIONS

Final Office Action for U.S. Appl. No. 14/806,202 dated Jun. 6, 2017, 20 pages.

Notice of Allowance for U.S. Appl. No. 14/806,202 dated Aug. 16, 2017, 7 pages.

* cited by examiner

METHOD AND APPARATUS FOR GENERATING AN INTELLIGENT PRIMARY KEY FACILITATING FASTER OBJECT RETRIEVAL

CROSS-REFERENCE TO RELATED APPLICATIONS

This application is a continuation of U.S. patent application Ser. No. 14/806,202, filed on Jul. 22, 2015, the contents of which are hereby incorporated by reference in their entirety.

TECHNOLOGICAL FIELD

Embodiments of the present invention relate generally to a method, apparatus, and computer program product for facilitating efficient database search operations for large databases, and more specifically, for facilitating a reduction in the number of required search operations.

BACKGROUND

Many users store personal information (e.g., email, contacts, pictures, videos, and music) on remote servers, and access that data using third party applications that are provided through a web-browser. For example, cloud computing enables application programs and file storage to be provided remotely over the Internet, typically through a web browser. Web browsers are capable of running applications that are application programming interfaces ("API's") to more robust applications running on remote servers. That is, in cloud computing, a web browser interfaces with and controls an application program that is running on a remote server. Through the web browser, the user can create, edit, save and delete files on the remote server via the remote application program. To store the information, a user must create an account, and to access the personal information, a user must log in. Current methods of account creation and authentication require a plurality of potentially costly search operations to authenticate the user.

BRIEF SUMMARY

A method, apparatus and computer program product are therefore provided according to an example embodiment of the present invention for facilitating efficient database search operations for large databases, and more specifically, for facilitating a reduction in the number of required search operations during account creation, authentication, or the like. That is, some embodiments of the present invention solve the problem of what would typically be a number of costly search operations and converts it to a single operation (e.g., a get operation or the like) by unique composite key design.

In some embodiments a method may be provided comprising causing creation of a user account object configured for storage in a database, the user account object comprising user personal information, causing creation of a user linked account object configured for storage in the database, the user linked account object comprising user credential information, the user linked account object linked to the user account object, generating, via processor, an identification field of the user linked account object, generation of the identification field comprising receiving at least (1) identification information, (2) an account type, and (3) realm information, and utilizing a hash function to generate a composite key as a function of the identification information, the account type, and the realm.

In some embodiments, the hash function being deterministic. In some embodiments, the method may further comprise, subsequent to creation, receiving log-in information, the log-in information comprising user identification information and user account type information, accessing realm information, and utilizing the hash function to generation a second composite key of the user identification information and user account type information and the realm information, accessing user account object by performing a single database search for the second composite key.

In some embodiments, the method may further comprise preventing duplicate user account object creation by, preceding generation of the generation of the identification field of the user linked account, utilizing a hash function to generate a potential composite key as a function of the identification information, the account type, and the realm, performing a single database search for the potential composite key, and in an instance in which the potential composite key is found in the database, causing an indication of a conflict to be returned to the user.

In some embodiments, the identification information is one of a username or an email address, and wherein the account type is one of a password or account reference. In some embodiments, the identification field of the user linked account object being dependent on the realm, the method further comprising providing a realm specific user experience subsequent to access of the user account object. In some embodiments, wherein the identification information or the account type is used for a plurality of user account object or user linked account objects.

In some embodiments, an apparatus may be provided comprising at least one processor and at least one memory including computer program code, the at least one memory and the computer program code configured to, with the processor, cause the apparatus to at least cause creation of a user account object configured for storage in a database, the user account object comprising user personal information, cause creation of a user linked account object configured for storage in the database, the user linked account object comprising user credential information, the user linked account object linked to the user account object, generate, via processor, an identification field of the user linked account object, generation of the identification field comprising receiving at least (1) identification information, (2) an account type, and (3) realm information, and utilize a hash function to generate a composite key as a function of the identification information, the account type, and the realm.

In some embodiments, the hash function being deterministic. In some embodiments, the at least one memory and the computer program code are further configured to, with the processor, cause the apparatus to, subsequent to creation, receive log-in information, the log-in information comprising user identification information and user account type information, access realm information, and utilize the hash function to generation a second composite key of the user identification information and user account type information and the realm information, access user account object by performing a single database search for the second composite key.

In some embodiments, the at least one memory and the computer program code are further configured to, with the processor, cause the apparatus to prevent duplicate user account object creation by, preceding generation of the generation of the identification field of the user linked account, utilize a hash function to generate a potential composite key as a function of the identification information, the account type, and the realm, perform a single database search for the potential composite key, and, in an instance in which the potential composite key is found in the database, cause an indication of a conflict to be returned to the user.

In some embodiments, the identification information is one of a username or an email address, and wherein the account type is one of a password or account reference. In some embodiments, the identification field of the user linked account object being dependent on the realm, and wherein the at least one memory and the computer program code are further configured to, with the processor, cause the apparatus to provide a realm specific user experience subsequent to access of the user account object. In some embodiments, the identification information or the account type is used for a plurality of user account object or user linked account objects.

In some embodiments, a computer program product may be provided comprising at least one non-transitory computer-readable storage medium having computer-executable program code instructions stored therein, the computer-executable program code instructions comprising program code instructions for causing creation of a user account object configured for storage in a database, the user account object comprising user personal information, causing creation of a user linked account object configured for storage in the database, the user linked account object comprising user credential information, the user linked account object linked to the user account object, generating, via processor, an identification field of the user linked account object, generation of the identification field comprising receiving at least (1) identification information, (2) an account type, and (3) realm information, and utilizing a hash function to generate a composite key as a function of the identification information, the account type, and the realm.

In some embodiments, the hash function being deterministic. In some embodiments, the computer-executable program code instructions further comprise program code instructions for subsequent to creation, receiving log-in information, the log-in information comprising user identification information and user account type information, accessing realm information, and utilizing the hash function to generation a second composite key of the user identification information and user account type information and the realm information, accessing user account object by performing a single database search for the second composite key.

In some embodiments, the computer-executable program code instructions further comprise program code instructions for preventing duplicate user account object creation by preceding generation of the generation of the identification field of the user linked account, utilizing a hash function to generate a potential composite key as a function of the identification information, the account type, and the realm, performing a single database search for the potential composite key, and, in an instance in which the potential composite key is found in the database, causing an indication of a conflict to be returned to the user.

In some embodiments, the identification information is one of a username or an email address, and wherein the account type is one of a password or account reference. In some embodiments, the identification field of the user linked account object being dependent on the realm, and wherein the computer-executable program code instructions further comprise program code instructions for providing a realm specific user experience subsequent to access of the user account object. In some embodiments, the identification information or the account type is used for a plurality of user account object or user linked account objects.

In some embodiments, an apparatus may be provided comprising means for causing creation of a user account object configured for storage in a database, the user account object comprising user personal information, means for causing creation of a user linked account object configured for storage in the database, the user linked account object comprising user credential information, the user linked account object linked to the user account object, means for generating, via processor, an identification field of the user linked account object, generation of the identification field comprising receiving at least (1) identification information, (2) an account type, and (3) realm information, and means for utilizing a hash function to generate a composite key as a function of the identification information, the account type, and the realm.

In some embodiments, the hash function being deterministic. In some embodiments, the apparatus may further comprise means for, subsequent to creation, receiving log-in information, the log-in information comprising user identification information and user account type information, means for accessing realm information, and means for utilizing the hash function to generation a second composite key of the user identification information and user account type information and the realm information, means for accessing user account object by performing a single database search for the second composite key.

In some embodiments, the apparatus may further comprise means for preventing duplicate user account object creation by means for, preceding generation of the generation of the identification field of the user linked account, utilizing a hash function to generate a potential composite key as a function of the identification information, the account type, and the realm, means for performing a single database search for the potential composite key, and means for, in an instance in which the potential composite key is found in the database, causing an indication of a conflict to be returned to the user.

In some embodiments, the identification information is one of a username or an email address, and wherein the account type is one of a password or account reference. In some embodiments, the identification field of the user linked account object being dependent on the realm, and the apparatus further comprising means for providing a realm specific user experience subsequent to access of the user account object. In some embodiments, the identification information or the account type is used for a plurality of user account object or user linked account objects.

BRIEF DESCRIPTION OF THE DRAWINGS

Having thus described embodiments of the invention in general terms, reference will now be made to the accompanying drawings, which are not necessarily drawn to scale, and wherein:

DETAILED DESCRIPTION

Some example embodiments will now be described more fully hereinafter with reference to the accompanying drawings, in which some, but not all embodiments are shown. Indeed, the example embodiments may take many different forms and should not be construed as limited to the embodiments set forth herein; rather, these embodiments are provided so that this disclosure will satisfy applicable legal requirements. Like reference numerals refer to like elements throughout. The terms "data," "content," "information," and similar terms may be used interchangeably, according to some example embodiments, to refer to data capable of being transmitted, received, operated on, and/or stored. Moreover, the term "exemplary", as may be used herein, is not provided to convey any qualitative assessment, but instead merely to convey an illustration of an example. Thus, use of any such terms should not be taken to limit the spirit and scope of embodiments of the present invention.

As used herein, the term "circuitry" refers to all of the following: (a) hardware-only circuit implementations (such as implementations in only analog and/or digital circuitry); (b) to combinations of circuits and software (and/or firmware), such as (as applicable): (i) to a combination of processor(s) or (ii) to portions of processor(s)/software (including digital signal processor(s)), software, and memory(ies) that work together to cause an apparatus, such as a mobile phone or server, to perform various functions); and (c) to circuits, such as a microprocessor(s) or a portion of a microprocessor(s), that require software or firmware for operation, even if the software or firmware is not physically present.

This definition of "circuitry" applies to all uses of this term in this application, including in any claims. As a further example, as used in this application, the term 'circuitry' would also cover an implementation of merely a processor (or multiple processors) or portion of a processor and its (or their) accompanying software and/or firmware. The term 'circuitry' would also cover, for example and if applicable to the particular claim element, a baseband integrated circuit or application specific integrated circuit for a mobile phone or a similar integrated circuit in a server, a cellular network device, or other network device.

Figure 1:
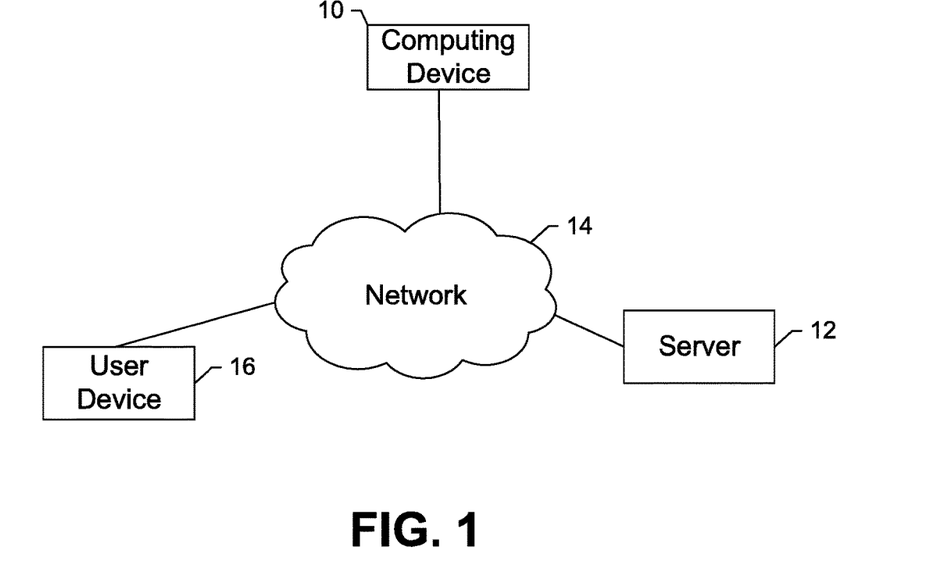
FIG. 1 is block diagram of a system that may be specifically configured in accordance with an example embodiment of the present invention.

Referring now of FIG. 1, a system that supports communication, either wirelessly or via a wireline, between a computing device 10 and a server 12 or other network entity (hereinafter generically referenced as a "server") is illustrated. As shown, the computing device and the server may be in communication via a network 14, such as a wide area network, such as a cellular network or the Internet, or a local area network. However, the computing device and the server may be in communication in other manners, such as via direct communications between the computing device and the server. The user device 16 will be hereinafter described as a mobile terminal, but may be either mobile or fixed in the various embodiments.

The computing device 10 and user device 16 may be embodied by a number of different devices including mobile computing devices, such as a personal digital assistant (PDA), mobile telephone, smartphone, laptop computer, tablet computer, or any combination of the aforementioned, and other types of voice and text communications systems. Alternatively, the computing device may be a fixed computing device, such as a personal computer, a computer workstation or the like. The server 12 may also be embodied by a computing device and, in one embodiment, is embodied by a web server. Additionally, while the system of FIG. 1 depicts a single server, the server may be comprised of a plurality of servers which may collaborate to support browsing activity conducted by the computing device.

Figure 2:
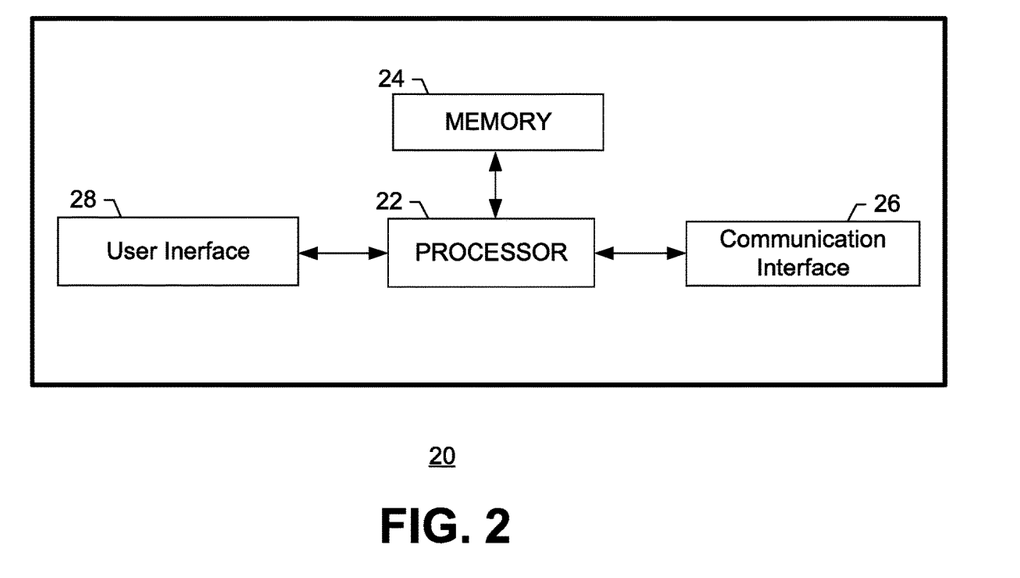
FIG. 2 is a block diagram of an apparatus that may be specifically configured in accordance with an example embodiment of the present invention.

Regardless of the type of device that embodies the computing device 10, the computing device may include or be associated with an apparatus 20 as shown in FIG. 2. In this regard, the apparatus may include or otherwise be in communication with a processor 22, a memory device 24, a communication interface 26 and a user interface 28. As such, in some embodiments, although devices or elements are shown as being in communication with each other, hereinafter such devices or elements should be considered to be capable of being embodied within the same device or element and thus, devices or elements shown in communication should be understood to alternatively be portions of the same device or element.

In some embodiments, the processor 22 (and/or co-processors or any other processing circuitry assisting or otherwise associated with the processor) may be in communication with the memory device 24 via a bus for passing information among components of the apparatus. The memory device may include, for example, one or more volatile and/or non-volatile memories. In other words, for example, the memory device may be an electronic storage device (e.g., a computer readable storage medium) comprising gates configured to store data (e.g., bits) that may be retrievable by a machine (e.g., a computing device like the processor). The memory device may be configured to store information, data, content, applications, instructions, or the like for enabling the apparatus 20 to carry out various functions in accordance with an example embodiment of the present invention. For example, the memory device could be configured to buffer input data for processing by the processor. Additionally or alternatively, the memory device could be configured to store instructions for execution by the processor.

As noted above, the apparatus 20 may be embodied by a computing device 10 configured to employ an example embodiment of the present invention. However, in some embodiments, the apparatus may be embodied as a chip or chip set. In other words, the apparatus may comprise one or more physical packages (e.g., chips) including materials, components and/or wires on a structural assembly (e.g., a baseboard). The structural assembly may provide physical strength, conservation of size, and/or limitation of electrical interaction for component circuitry included thereon. The apparatus may therefore, in some cases, be configured to implement an embodiment of the present invention on a single chip or as a single "system on a chip." As such, in some cases, a chip or chipset may constitute means for performing one or more operations for providing the functionalities described herein.

The processor 22 may be embodied in a number of different ways. For example, the processor may be embodied as one or more of various hardware processing means such as a coprocessor, a microprocessor, a controller, a digital signal processor (DSP), a processing element with or without an accompanying DSP, or various other processing circuitry including integrated circuits such as, for example, an ASIC (application specific integrated circuit), an FPGA (field programmable gate array), a microcontroller unit (MCU), a hardware accelerator, a special-purpose computer chip, or the like. As such, in some embodiments, the processor may include one or more processing cores configured to perform independently. A multi-core processor may enable multiprocessing within a single physical package. Additionally or alternatively, the processor may include one or more processors configured in tandem via the bus to enable independent execution of instructions, pipelining and/or multithreading.

In an example embodiment, the processor 22 may be configured to execute instructions stored in the memory device 24 or otherwise accessible to the processor. Alternatively or additionally, the processor may be configured to execute hard coded functionality. As such, whether configured by hardware or software methods, or by a combination thereof, the processor may represent an entity (e.g., physically embodied in circuitry) capable of performing operations according to an embodiment of the present invention while configured accordingly. Thus, for example, when the processor is embodied as an ASIC, FPGA or the like, the processor may be specifically configured hardware for conducting the operations described herein. Alternatively, as another example, when the processor is embodied as an executor of software instructions, the instructions may specifically configure the processor to perform the algorithms and/or operations described herein when the instructions are executed. However, in some cases, the processor may be a processor of a specific device (e.g., a head mounted display) configured to employ an embodiment of the present invention by further configuration of the processor by instructions for performing the algorithms and/or operations described herein. The processor may include, among other things, a clock, an arithmetic logic unit (ALU) and logic gates configured to support operation of the processor. In one embodiment, the processor may also include user interface circuitry configured to control at least some functions of one or more elements of the user interface 28.

Meanwhile, the communication interface 26 may be any means such as a device or circuitry embodied in either hardware or a combination of hardware and software that is configured to receive and/or transmit data between the computing device 10 and a server 12. In this regard, the communication interface 26 may include, for example, an antenna (or multiple antennas) and supporting hardware and/or software for enabling communications wirelessly. Additionally or alternatively, the communication interface may include the circuitry for interacting with the antenna(s) to cause transmission of signals via the antenna(s) or to handle receipt of signals received via the antenna(s). For example, the communications interface may be configured to communicate wirelessly with the head mounted displays 10, such as via Wi-Fi, Bluetooth or other wireless communications techniques. In some instances, the communication interface may alternatively or also support wired communication. As such, for example, the communication interface may include a communication modem and/or other hardware/software for supporting communication via cable, digital subscriber line (DSL), universal serial bus (USB) or other mechanisms. For example, the communication interface may be configured to communicate via wired communication with other components of the computing device.

The user interface 28 may be in communication with the processor 22, such as the user interface circuitry, to receive an indication of a user input and/or to provide an audible, visual, mechanical, or other output to a user. As such, the user interface may include, for example, a keyboard, a mouse, a joystick, a display, a touch screen display, a microphone, a speaker, and/or other input/output mechanisms. In some embodiments, a display may refer to display on a screen, on a wall, on glasses (e.g., near-eye-display), in the air, etc. The user interface may also be in communication with the memory 24 and/or the communication interface 26, such as via a bus.

In an example embodiment of the present invention, a user may utilize a system, including a computing device, such as a laptop, mobile device or the like to create an account (e.g., an email account, a social network account, etc.). For example, a user may create a "HERE" account at HERE.com. Creation of the HERE account may create, for example, two objects in a database (e.g., dynamoDB or the like) per user creation, the two objects being UserAccount and UserLinkedAccount. UserAccount stores users personal information like first name, last name, email, and address and UserLinkedAccount stores users credentials like password, type of login (password/facebook/google), expiration.

An identification field (e.g., UserLinkedAccount_ID) may be based on a plurality of parameters, for example, user's external id, an account type and a realm. Using this key, the system may look up a user's linkedAccount in constant time. Thus the system may reduce three potential costly search operations (e.g., search by email, followed by a filter by an account type, and followed by filter by realm) to a, in some embodiments, single inexpensive operation (e.g., a GET operation).

Figure 3:
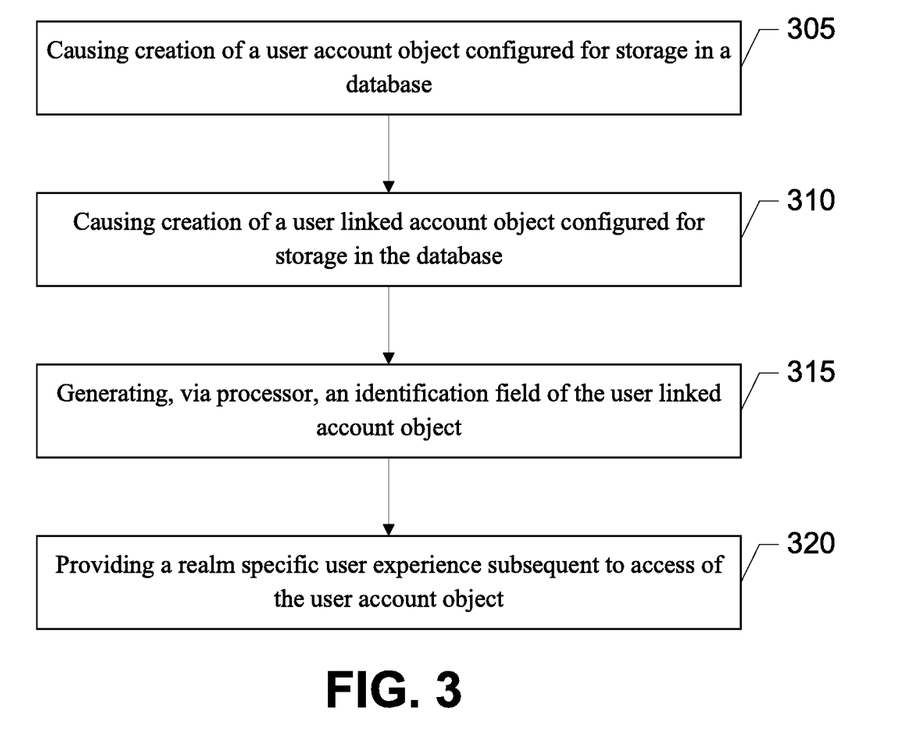
FIG. 3 is an example flowchart illustrating a method of operating an example apparatus in accordance with an embodiment of the present invention.
Figure 4:
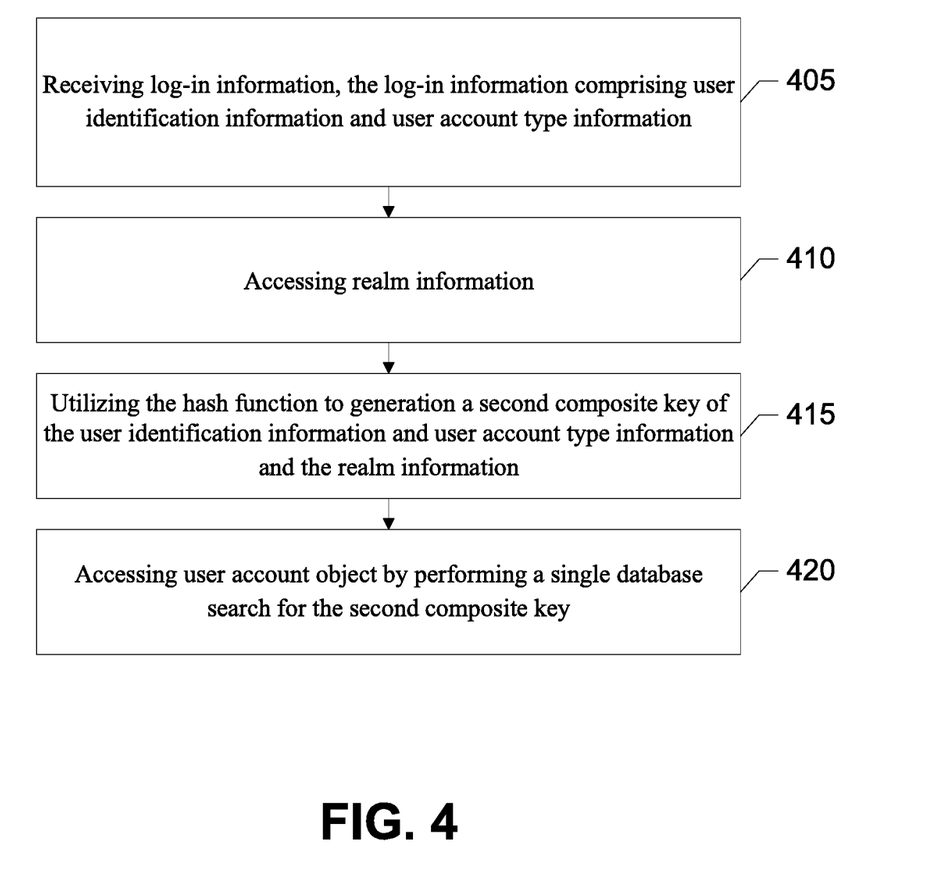
FIG. 4 is an example flowchart illustrating a method of operating an example apparatus in accordance with an embodiment of the present invention.
Figure 5:
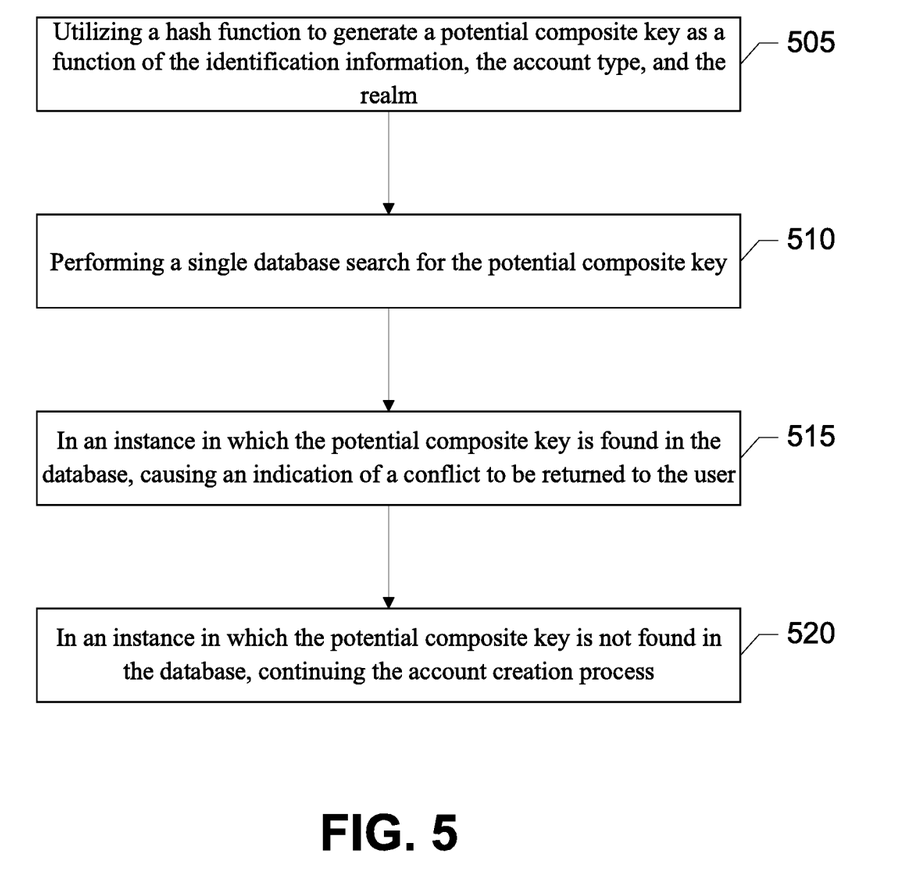
FIG. 5 is an example flowchart illustrating a method of operating an example apparatus in accordance with an embodiment of the present invention.

FIGS. 3, 4, and 5 illustrate example flowcharts of the example operations performed by a method, apparatus and computer program product in accordance with an embodiment of the present invention. FIG. 3 is shown from the perspective of the user device, FIG. 4 from the perspective of the server, and FIG. 5 from the perspective of the computing device. It will be understood that each block of the flowcharts, and combinations of blocks in the flowcharts, may be implemented by various means, such as hardware, firmware, processor, circuitry and/or other device associated with execution of software including one or more computer program instructions. For example, one or more of the procedures described above may be embodied by computer program instructions. In this regard, the computer program instructions which embody the procedures described above may be stored by a memory 26 of an apparatus employing an embodiment of the present invention and executed by a processor 24 in the apparatus. As will be appreciated, any such computer program instructions may be loaded onto a computer or other programmable apparatus (e.g., hardware) to produce a machine, such that the resulting computer or other programmable apparatus provides for implementation of the functions specified in the flowchart block(s). These computer program instructions may also be stored in a non-transitory computer-readable storage memory that may direct a computer or other programmable apparatus to function in a particular manner, such that the instructions stored in the computer-readable storage memory produce an article of manufacture, the execution of which implements the function specified in the flowchart block(s). The computer program instructions may also be loaded onto a computer or other programmable apparatus to cause a series of operations to be performed on the computer or other programmable apparatus to produce a computer-implemented process such that the instructions which execute on the computer or other programmable apparatus provide operations for implementing the functions specified in the flowchart block(s). As such, the operations of FIGS. 3, 4, and 5, when executed, convert a computer or processing circuitry into a particular machine configured to perform an example embodiment of the present invention. Accordingly, the operations of FIGS. 3, 4, and 5 define an algorithm for configuring a computer or processing to perform an example embodiment. In some cases, a general purpose computer may be provided with an instance of the processor which performs the algorithms of FIGS. 3, 4, and 5 to transform the general purpose computer into a particular machine configured to perform an example embodiment.

Accordingly, blocks of the flowchart support combinations of means for performing the specified functions and combinations of operations for performing the specified functions. It will also be understood that one or more blocks of the flowcharts, and combinations of blocks in the flowcharts, can be implemented by special purpose hardware-based computer systems which perform the specified functions, or combinations of special purpose hardware and computer instructions.

In some embodiments, certain ones of the operations herein may be modified or further amplified as described below. Moreover, in some embodiments additional optional operations may also be included as shown by the blocks having a dashed outline in FIGS. 3, 4 and 5. It should be appreciated that each of the modifications, optional additions or amplifications below may be included with the operations above either alone or in combination with any others among the features described herein.

In some example embodiments, a method, apparatus and computer program product may be configured for facilitating efficient database search operations for large databases, and more specifically, for facilitating a reduction in the number of required search operations during account creation using a user device such as a smart phone, cellular phone, tablet, laptop or any type of mobile terminal.

FIG. 3 is an example flowchart illustrating a method for account creation in accordance with an embodiment of the present invention. It should be appreciated that the operations of FIG. 3 may be performed by a smart phone, though in some embodiments, are not limited to cellular systems. For example, non-cellular solutions such as a wireless local area network (WLAN) may similarly permit account creation. Moreover, the operations of FIG. 3 may be performed by any other computing device, such as a laptop, tablet, or desktop computer or the like utilizing any type of network.

In an exemplary embodiment of the present invention, a user may utilize a system, including, as described above, a computing device, such as a smart phone or the like to create an account (e.g., an email account, a social network account, etc.). For example, a user may create a "HERE" account at HERE.com. Creation of the HERE account may create, for example, two objects in a database (e.g., dynamoDB or the like) per user creation, the two objects being UserAccount and UserLinkedAccount. UserAccount stores a user's personal information like first name, last name, email, and address and UserLinkedAccount stores a user's credentials like password, type of login (email & password/third party account federation (e.g., Facebook®, Google, LinkedIn etc.), expiration, or the like.

As such, as shown in block 305 of FIG. 3, an apparatus, such as apparatus 20 embodied by the user device 16, may be configured to cause creation of a user account object configured for storage in a database, the user account object comprising user personal information. The apparatus embodied by user device 16 therefore includes means, such as the processor 22, the communication interface 26 or the like, for causing creation of a user account object configured for storage in a database, the user account object comprising user personal information. In some embodiments, the user personal information may include, for example, a first name, a last name, an email address, or the like. As shown in block 310 of FIG. 3, an apparatus, such as apparatus 20 embodied by the user device 16, may be configured to cause creation of a user linked account object configured for storage in the database. The apparatus embodied by user device 16 therefore includes means, such as the processor 22, the communication interface 26 or the like, for causing creation of a user linked account object configured for storage in the database. In some embodiments, the user linked account object may comprise user credential information. In some embodiments, the user linked account object may be linked to the user account object.

An identification field (e.g., UserLinkedAccount_ID) may also be generated. The identification field may be based on a plurality of parameters, for example, user's external id, an account type and a realm. Subsequently, using this key, the system may be configured to look up a user's linked account in constant time. As shown in block 315 of FIG. 3, an apparatus, such as apparatus 20 embodied by the user device 16, may be configured to generate, via processor, an identification field of the user linked account object. The apparatus embodied by user device 16 therefore includes means, such as the processor 22, the communication interface 26 or the like, for generating an identification field of the user linked account object.

As one of ordinary skill in the art would appreciate, hashing is the transformation of a string of characters into a usually shorter fixed-length value or key that represents the original string. Hashing may be used to index and retrieve items in a database as it may be faster to find the item using the shorter hashed key than to find it using the original value. In some embodiments, a hash function utilized by the system (e.g., SHA1_Hash) may be deterministic, deterministic meaning that for the same input parameters, the hash function will always produce the same hash, or output.

In some embodiments, the identification field, (e.g., UserLinkedAccount_Id) may be computed as such.

```
UserLinkedAccount_Id = SHA1_Hash {
    User_id (email/facebook_id) +
    account_type (password/facebook) +
    realm (the namespace the account is in, description below)
}
```

In some embodiments, the UserLinkedAccount_ID may be a composite key and may be computed using the hash of, for example, the above three parameters (i.e. User_id, account type, and realm). This composite key may then be stored as id field (primary key) as part of the UserLinkedAccount object in the database. In some embodiments, UserLinkedAccount object may consist of following fields:

```
case class UserLinkedAccount(
    id: String, //SHA1(userId, accountType and Realm)
    hereAccountId: String, // connected with UserAccount.id
```

-continued

```
externalUserId: String, //example facebook id, email
accountType: AccountType,
creatorClientId: String,
secrets: List[Secret],
hereRealm: Realm)
```

In one exemplary embodiment, a user may sign up for a HERE Account on Here.com using an email address (e.g., abc@gmail.com) and a password.

Using the HASH function above,

```
UserLinkedAccount_ID=SHA1_Hash
    (abc@gmail.com+"password"+"HERE")
```

In another exemplary embodiment, a user may sign up for an account on, for example, Jaguar companion app page, using an email address associated with the companion app page (e.g., xyz@jaguar.com). Using the HASH function above,

```
UserLinkedAccount_ID=SHA1_Hash
    (xyz@jaguar.com+"password"+"JAGUAR")
```

In another exemplary embodiments, a user may sign up for a HERE Account on Here.com using Login with Facebook®. As such,

```
UserLinkedAccount_ID=SHA1_Hash
    (xyz@jaguar.com+"facebook"+"HERE")
```

Accordingly, generating the primary key of the user-LinkedAccount object may enable a system to retrieve the object in O(1) time during Sign In. Once the object is fetched, the system may enable verification that the stored credentials are same as the one user provided. FIG. 4 is an example flowchart illustrating a method for use by a network device, such as for example server 12, for performing a log in process, in accordance with an embodiment of the present invention.

In some embodiments, the HERE Account realms may partition the account data into original equipment manufacturer (OEM) namespaces. In other words, a system enabling a user to sign up for an account in realm A, will not automatically allow the user to sign in on realm B using the same email and password or other credentials, such as Facebook® tokens or the like.

In some embodiments, the system may enable, or in other embodiments, require, clients to explicitly opt-in to a realm, by, for example, transmitting a realm value HTTP header (e.g., X-HA-Realm: realm value). In some embodiments, realms may not act as a security measure, but instead (or also) be configured to drive an OEM differentiated user experience. For example, a user of here.com may be treated as a first-time user when visiting jaguar.com. In some embodiments, a user may technically belong to several realms at once, and his user account may hold credentials for multiple realms. Additionally or alternatively to the sign-in functionality, realms may also affect most other APIs. For example, account emails and webpages may be customized to match OEM branding of a requested realm. Accordingly, the identification field of the user linked account object is dependent on the realm, and as shown in block 320 of FIG. 3, the apparatus 20 embodied by the server 12 may be configured to provide a realm specific user experience subsequent to access of the user account object. The apparatus embodied by the computing device therefore includes means, such as the processor 22, the communication interface 26 or the like, for providing a realm specific user experience subsequent to access of the user account object.

Returning to FIG. 4, as shown in block 405 of FIG. 4, the apparatus 20 embodied by the server 12 may be configured to receive log-in information, the log-in information comprising user identification information and user account type information. The apparatus embodied by the computing device therefore includes means, such as the processor 22, the communication interface 26 or the like, for receiving log-in information, the log-in information comprising user identification information and user account type information.

As shown in block 410 of FIG. 4, the apparatus 20 embodied by the server 12 may be configured to access realm information. The apparatus embodied by the computing device therefore includes means, such as the processor 22, the communication interface 26 or the like, for accessing realm information.

As shown in block 415 of FIG. 4, the apparatus 20 embodied by the server 12 may be configured to utilize the hash function to generation a second composite key of the user identification information and user account type information and the realm information. The apparatus embodied by the computing device therefore includes means, such as the processor 22, the communication interface 26 or the like, for utilizing the hash function to generation a second composite key of the user identification information and user account type information and the realm information.

As shown in block 420 of FIG. 4, the apparatus 20 embodied by the server 12 may be configured to access user account object by performing a single database search for the second composite key. The apparatus embodied by the computing device therefore includes means, such as the processor 22, the communication interface 26 or the like, for accessing user account object by performing a single database search for the second composite key. As such, a log in or authentication process may be performed with a single search of the database, instead of a plurality of potentially costly searches.

FIG. 5 is an example flowchart illustrating a method for use by a computing device for preventing duplicate account creation and/or enforcing uniqueness of, for example, email, username or the like, in accordance with an embodiment of the present invention.

For example, before creating an account or in the process of creating an account, the system may generate what would be the identification field of the user account object or user linked account object to determine if an account already exists. As such, as shown in block 505 of FIG. 5, an apparatus, such as apparatus 20 embodied by the user device 16, may be configured to utilize a hash function to generate a potential composite key as a function of the identification information, the account type, and the realm. The apparatus embodied by user device 16 therefore includes means, such as the processor 22, the communication interface 26 or the like, for utilizing a hash function to generate a potential composite key as a function of the identification information, the account type, and the realm.

Once the potential composite key is generated, the database is searched to determine if the key already exists. As shown in block 510 of FIG. 5, an apparatus, such as apparatus 20 embodied by the user device 16, may be configured to perform a single database search for the potential composite key. The apparatus embodied by user device 16 therefore includes means, such as the processor 22, the communication interface 26 or the like, for performing a single database search for the potential composite key.

If the key exists, the system may indicate to the user that an account exists or the email has been used or the like.

Accordingly, as shown in block 515 of FIG. 5, an apparatus, such as apparatus 20 embodied by the user device 16, may be configured to, in an instance in which the potential composite key is found in the database, cause an indication of a conflict to be returned to the user. The apparatus embodied by user device 16 therefore includes means, such as the processor 22, the communication interface 26 or the like, for, in an instance in which the potential composite key is found in the database, causing an indication of a conflict to be returned to the user.

Whereas, if the search of the database does not reveal that the potential composite is already in use, account creation may continue. As shown in block 520 of FIG. 5, an apparatus, such as apparatus 20 embodied by the user device 16, may be configured to, in an instance in which the potential composite key is not found in the database, continue the account creation process. The apparatus embodied by user device 16 therefore includes means, such as the processor 22, the communication interface 26 or the like, for, in an instance in which the potential composite key is not found in the database, continuing the account creation process, for example, as shown in FIG. 5.

Many modifications and other embodiments of the inventions set forth herein will come to mind to one skilled in the art to which these inventions pertain having the benefit of the teachings presented in the foregoing descriptions and the associated drawings. Therefore, it is to be understood that the inventions are not to be limited to the specific embodiments disclosed and that modifications and other embodiments are intended to be included within the scope of the appended claims. Moreover, although the foregoing descriptions and the associated drawings describe example embodiments in the context of certain example combinations of elements and/or functions, it should be appreciated that different combinations of elements and/or functions may be provided by alternative embodiments without departing from the scope of the appended claims. In this regard, for example, different combinations of elements and/or functions than those explicitly described above are also contemplated as may be set forth in some of the appended claims. Although specific terms are employed herein, they are used in a generic and descriptive sense only and not for purposes of limitation.

What is claimed is:

1. A method comprising:
   receiving, at a processor, at least:
   (1) identification information;
   (2) an account type; and
   (3) realm information;
   applying a deterministic hash function to the received identification information, the account type, and the realm information to establish a first composite key, wherein the first composite key is a hash of the identification information, the account type, and the realm information;
   performing a single database search in response to establishing the first composite key for a matching composite key for correlation with the first composite key;
   in direct response to correlating the first composite key with a matching composite key in the single database, providing an indication of a conflict with an existing account to a user; and
   in response to failing to correlate the first composite key with a matching key, providing for creation of a user linked account, wherein the user linked account provides a realm-dependent user experience, and wherein the user linked account is partitioned according to the realm information.

2. The method according to claim 1, wherein the identification information is one of a username or an email address, and wherein the account type is one of a password or account reference.

3. The method according to claim 1, wherein an identification field for user identification information of the user account object is dependent on the realm, the method further comprising:
   providing the realm specific user experience subsequent to access of the user account object.

4. The method according to claim 1, wherein the identification information or the account type is used for a plurality of user account objects.

5. The method of claim 1, wherein the realm-dependent user experience comprises differentiated user treatment based on the realm.

6. The method of claim 1, wherein providing an indication of a conflict comprises providing the indication of the conflict to a user associated with the identification information.

7. An apparatus comprising at least one processor and at least one memory including computer program code, the at least one memory and the computer program code configured to, with the processor, cause the apparatus to at least:
   receive at least:
   (1) identification information;
   (2) an account type; and
   (3) realm information;
   apply a deterministic hash function to the received identification information, the account type, and the realm information to establish a first composite key, wherein the first composite key is a hash of the identification information, the account type, and the realm information;
   perform a single database search in response to establishing the first composite key for a matching composite key for correlation with the first composite key;
   in direct response to correlating the first composite key with a matching composite key in the single database, provide an indication of a conflict with an existing account to a user; and
   in response to failing to correlate the first composite key with a matching key, provide for creation of a user linked account, wherein the user linked account provides a realm-dependent user experience, and wherein the user linked account is partitioned according to the realm information.

8. The apparatus according to claim 7, wherein the identification information is one of a username or an email address, and wherein the account type is one of a password or account reference.

9. The apparatus according to claim 7, wherein an identification field for user identification information of the user account object is dependent on the realm, the apparatus further caused to:
   provide the realm specific user experience subsequent to access of the user account object.

10. The apparatus according to claim 7, wherein the identification information or the account type is used for a plurality of user account objects.

11. The apparatus of claim 7, wherein the realm-dependent user experience comprises differentiated user treatment based on the realm.

12. The apparatus of claim 7, wherein causing the apparatus to provide an indication of a conflict comprises causing the apparatus to provide the indication of the conflict to a user associated with the identification information.

13. A computer program product comprising at least one non-transitory computer-readable storage medium having computer-executable program code instructions stored therein, the computer-executable program code instructions comprising program code instructions to: receive at least:
   (1) identification information;
   (2) an account type; and
   (3) realm information;
   apply a deterministic hash function to the received identification information, the account type, and the realm information to establish a first composite key, wherein the first composite key is a hash of the identification information, the account type, and the realm information;
   perform a single database search in response to establishing the first composite key for a matching composite key for correlation with the first composite key;
   in direct response to correlating the first composite key with a matching composite key in the single database, provide an indication of a conflict with an existing account to a user; and
   in response to failing to correlate the first composite key with a matching key, provide for creation of a user linked account, wherein the user linked account provides a realm-dependent user experience, and wherein the user linked account is partitioned according to the realm information.

14. The computer program product according to claim 13, wherein the identification information is one of a username or an email address, and wherein the account type is one of a password or account reference.

15. The computer program product according to claim 13, wherein an identification field for user identification information of the user account object is dependent on the realm, the computer program product further comprising program code instructions to:
   provide the realm specific user experience subsequent to access of the user account object.

16. The computer program product according to claim 13, wherein the identification information or the account type is used for a plurality of user account objects.

17. The computer program product of claim 13, wherein the realm-dependent user experience comprises differentiated user treatment based on the realm.

18. The method of claim 13, wherein the program code instructions to provide an indication of a conflict comprise program code instructions to provide the indication of the conflict to a user associated with the identification information.

* * * * *